(No Model.)

J. T. SMITH.
WHEEL TIRE.

No. 501,967. Patented July 25, 1893.

Witnesses:
Geo. W. Ueffinger.
A. A. Baxter

Inventor.
John T. Smith
by A. H. Ste Marie
att'y

UNITED STATES PATENT OFFICE.

JOHN T. SMITH, OF BRIDGEPORT, CONNECTICUT, ASSIGNOR OF ONE-HALF TO ARTHUR HERBERT SMITH, OF NEW YORK, N. Y.

WHEEL-TIRE.

SPECIFICATION forming part of Letters Patent No. 501,967, dated July 25, 1893.

Application filed October 24, 1892. Serial No. 449,847. (No model.)

*To all whom it may concern:*

Be it known that I, JOHN T. SMITH, a citizen of the United States, residing at Bridgeport, in the county of Fairfield and State of Connecticut, have invented a certain new and useful Improvement in Tires, of which the following is a specification.

My invention relates particularly to improvements in that class of tires which are used for bicycle or carriage wheels and such other wheels as are calling for an encircling band or hoop possessed of a certain softness and elasticity.

The object of my improvement is to produce a tire of simple construction and graceful design combining these qualities in a superior degree, but commendable as well for its lightness, durability and low cost of manufacture.

My improved tire consists of a hoop or band of elastic material formed in two parts which I term, respectively, the crown and the webbing. These parts are set at right angles one to the other, the webbing projecting inwardly from the crown. Both are oblong in cross-section and made to be partially inclosed in a wheel-rim specially designed to receive and support them. The webbing has notches or indentations in its margin, which presents an endless series of points or disconnected sections all finding a bearing upon the periphery of the wheel but adapted to act freely and independently of one another. Depressions are likewise provided in the under side of the crown to isolate its edges from the webbing and allow them an independent action of their own, which they exert upon opposite sides of the wheel. The various portions of the tire are thus adapted to work separately, though conjointly, with the result that both easier compression and quicker recoil are secured, together with several other advantages hereinafter set forth in detail.

Figure 1:
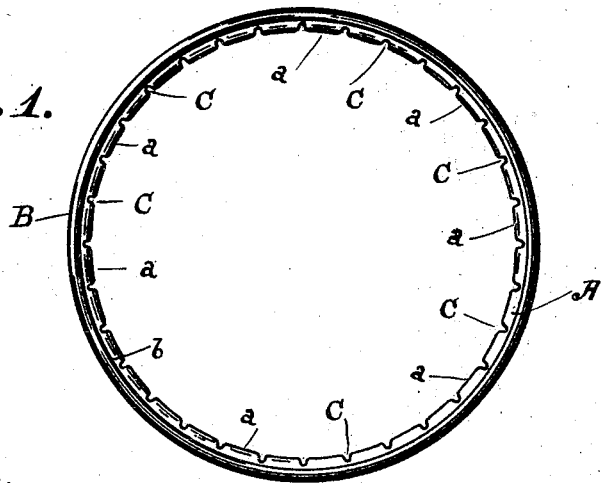
Figure 4:
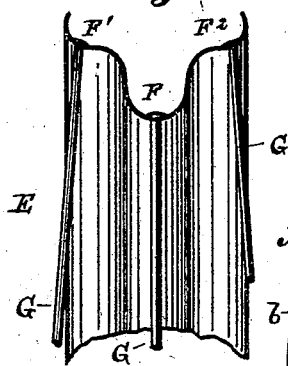
Figure 2:
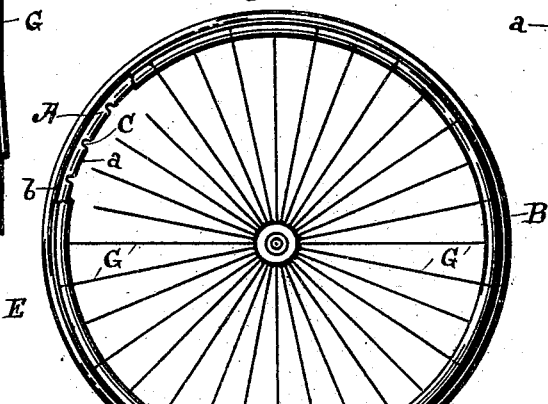
Figure 3:
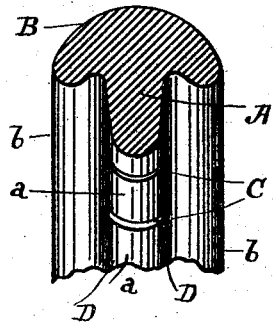
Figure 5:
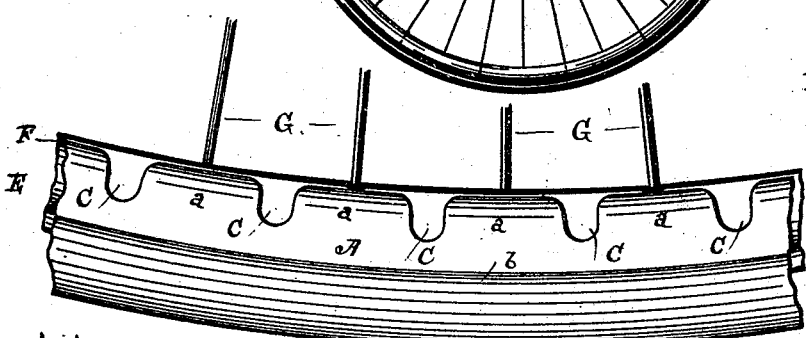
Figure 6:
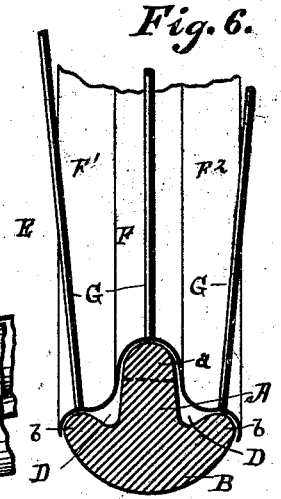

Referring to the accompanying drawings, which form part of this specification,—Figure 1 is a side elevation, on a small scale, of the tire as it appears when removed from the wheel. Fig. 2 is a similar view of the wheel with the tire applied thereto, part being broken away to shown the notches in the tire's margin. Fig. 3 is a cross-section of a small portion of a full-sized tire. Fig. 4 is a like view of a corresponding portion of the wheel's rim. Fig. 5 is a broken side elevation of part of a full-sized wheel and tire, one side of the rim being removed to show the webbing and the notches therein; and Fig. 6 is a transverse section of part of the tire and its inclosing rim.

Similar parts are indicated by similar letters of reference throughout all the views.

The whole tire, as shown at Fig. 1, is preferably made of vulcanized rubber, though cork or other elastic material may also enter into its composition. This tire may be molded or otherwise formed in a single piece, but it comprises two distinct parts, which I have called the webbing and the crown, respectively designated by the letters A and B. A, the webbing, forms the inner part, and B, the crown, the outward portion. Both are oblong in cross-section and they are set at right angles one to the other, the webbing running inwardly from the central part of the crown, so that the tire reaches its greatest thickness and its greatest width at the points where they meet. By preference, the webbing is made slightly tapering toward the edge, which is rounded. The top or face of the crown is also rounded, being semi-circular in form and ending in overhanging lobes or flanges $b$, which project outwardly a uniform distance from each side of the webbing.

In the edge or margin of the webbing are formed notches or indentations C. These may vary in depth and width according to the size or dimensions of the tire and the firmness of the material of which it is made. They are cut clear through the margin of the webbing and are located at regular but more or less close intervals according to circumstances. These notches are for the purpose of dividing the margin in a convenient number of at least partly-disconnected sections or points, which may contract and expand independently of one another.

Depressions D, somewhat analogous to the notches C but running longitudinally instead of crosswise, are provided in the under side of the crown at the points where the lobes *b* curve up toward the webbing. These serve to isolate the edges of the crown from the webbing and secure for them also separate or independent compression and dilatation.

E represents a wheel to which my tire is applicable. This wheel is of the usual construction, except the rim which is curved so as to form three grooves or channels F F' F² adapted to receive and support, respectively, the projecting edges of the webbing and crown composing the tire. The points or disconnected sections of the webbing, it will be seen, all rest in the central and deepest groove, while the tips of the lobes find a bearing in the side channels, but no part of the rim reaches up into the notches nor into the lateral depressions. The crown is made to project out a sufficient distance from the rim to allow for full compression outside of it and avoid the denting of the rim on stones and like objects. On the other hand, the rim is made a trifle wider than the crown and slightly curved up to inclose the lobes and accommodate their expansion, so that the tire may not be cut at the edges nor spring out of place, but will be drawn firmly on and cling to the rim when under compression and expand without binding when the pressure is off.

The spokes G extending from the hub to the periphery of the wheel may be arranged in various ways, but the most practical arrangement, it is conceived, is to run up part of them to the center of the rim right under the webbing and the remainder to the sides on which the lobes of the crown rest.

It will be observed that a tire constructed on the foregoing lines and applied as directed efficiently meets the requirements of velocipedes and other vehicles of the class above referred to. In the first place, such a tire is very light because stripped of all unnecessary appendages and freed from everything that constitutes only bulk and weight. While it is devoid of all undue weight, it is nevertheless possessed of much strength, owing to its peculiar shape, which presents the greatest thickness where the pressure is always greatest, that is from the center of the crown to the inner edge of the webbing. In this respect, it is believed to be superior to either the ordinary cushion or the pneumatic tire because able to stand rougher surface and not liable to be hurt or irreparably damaged by punctures or breaks. It therefore excels in durability. Another feature of my improved tire is the elasticity which it derives from and is the immediate result of my improved mode of construction. The tire having been provided with longitudinal depressions or recesses in the under side of its crown and a large number of notches across the margin of its webbing, it becomes very sensitive to pressure and quite springy, the lobes at the surface and the notched edge at the bottom having ample room to accommodate the compression, contraction, or expansion, wherever it takes place. Each lobe being practically isolated from the body of the tire, and each section of the webbing's margin being disconnected from the neighboring ones, these parts act and are acted upon freely and independently, without useless strain upon or hinderance from the others. No part of the tire is impeded in its contraction or expansion and each performs its function in quicker time than would be possible otherwise. But while there is separate and independent contraction and expansion, there is also joint action, since the disconnected parts of the webbing and the two lobes of the crown are subject to the same influences and portions of them are acting as well as being acted upon together. Hence more life and resiliency and a quicker rebound of the tire after compression. This joint action of the upper and lower portions assisting each other in producing elasticity imparts a sort of automatic movement to the tire which makes itself felt upon the wheel and somewhat favors its speed. The tire, besides, is as soft and easy as the hollow ones and yet it need not be inflated, nor does it call for specially prepared material and an expensive mode of construction. A firmer quality of rubber may be used for it than for tires of the latter class, with the result that it will wear better, ride more easily on rough ground and remain unaffected by moisture and dirt. In short, I believe that it has all the advantages of the ordinary cushion and pneumatic tires, without the drawbacks of either.

The above-described construction admits of several modifications. For instance, perforations in the body of the webbing may take the place of the notches at the margin thereof, although they would be less effective unless they were used in connection with such notches. Similarly, perforations may be had in the center of the tire or in its upper part, but this mode of construction is not considered practical, because such perforations would be exposed to view and remain unprotected. They would be liable to fill with dirt or foreign matter and would thus partly destroy the usefulness of the tire and mar its appearance. Lastly, indentations or notches may be made in the lower edge of the crown as well as in the margin of the webbing, if desired.

Having described my invention, what I claim as new, and desire to secure by Letters Patent of the United States, is—

1. An elastic tire comprising a flanged crown and a webbing provided with transverse openings, substantially as set forth.

2. An elastic tire comprising a crown and an oblong webbing having marginal disconnected sections, substantially as set forth.

3. An elastic tire comprising a webbing and a flanged crown forming longitudinal depressions on each side of the webbing, substantially as set forth.

4. The combination, in an elastic tire, of a notched webbing, a crown thereon, and lobes or flanges projecting from said crown, substantially as set forth.

In testimony whereof I affix my signature in presence of two witnesses.

JOHN T. SMITH. [L. S.]

Witnesses:
ALBERT H. MORRIS,
CHAS. S. COLE.